June 14, 1960 S. CUDNOHUFSKY 2,940,263
TRACER CONTROL CIRCUIT FOR MACHINE TOOLS
Filed Aug. 29, 1958 5 Sheets-Sheet 5
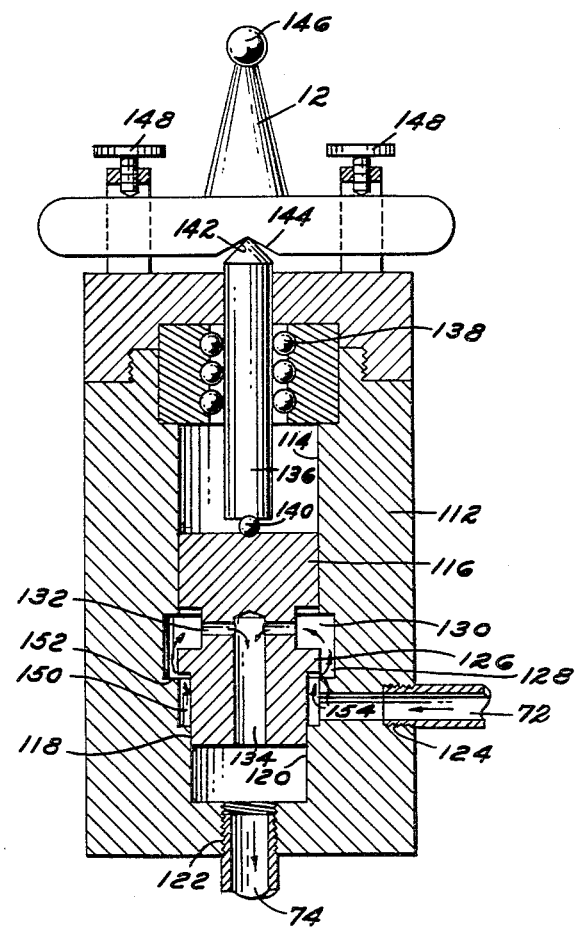
INVENTOR.
SYLVESTER CUDNOHUFSKY United States Patent Office 2,940,263
Patented June 14, 1960

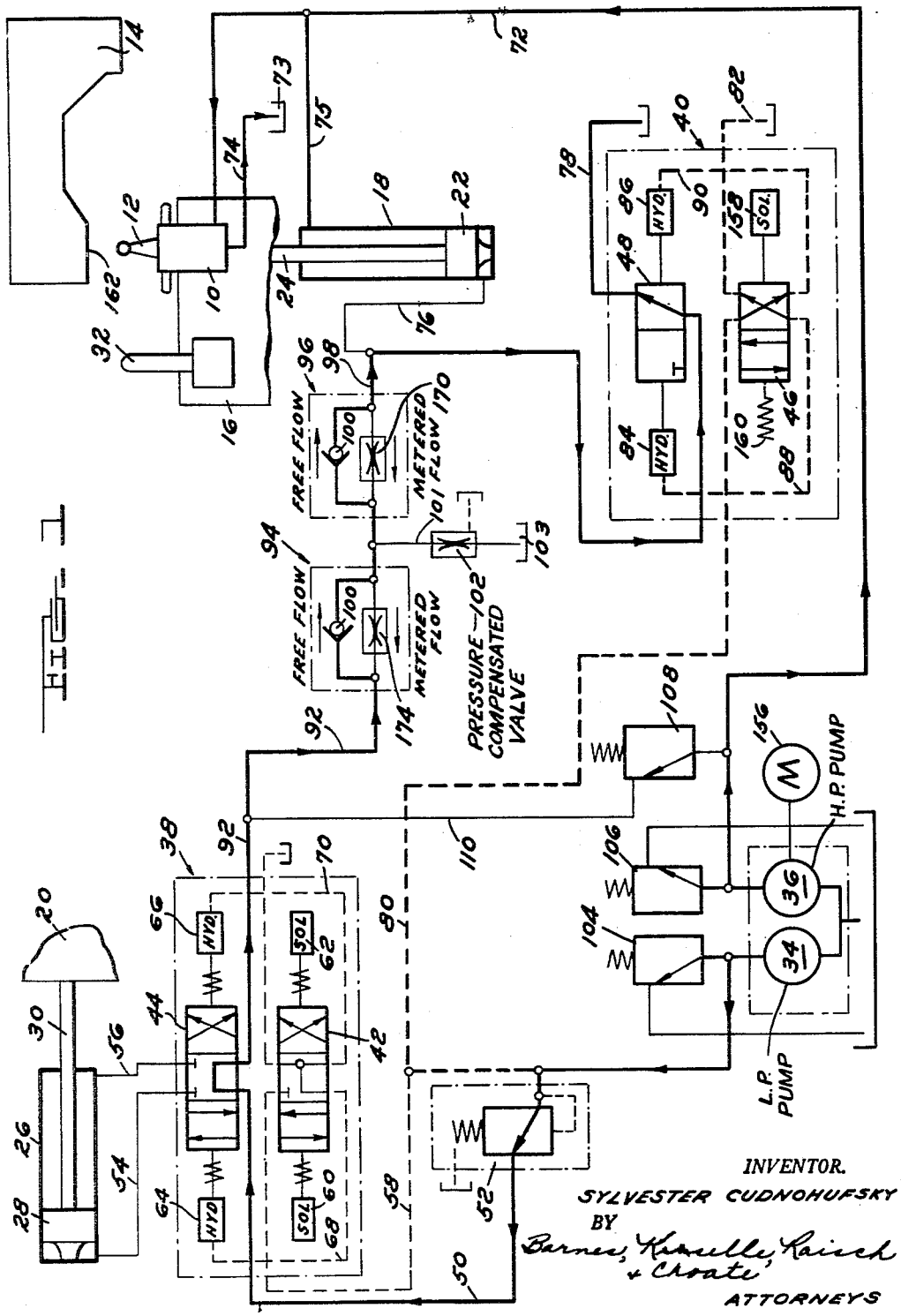

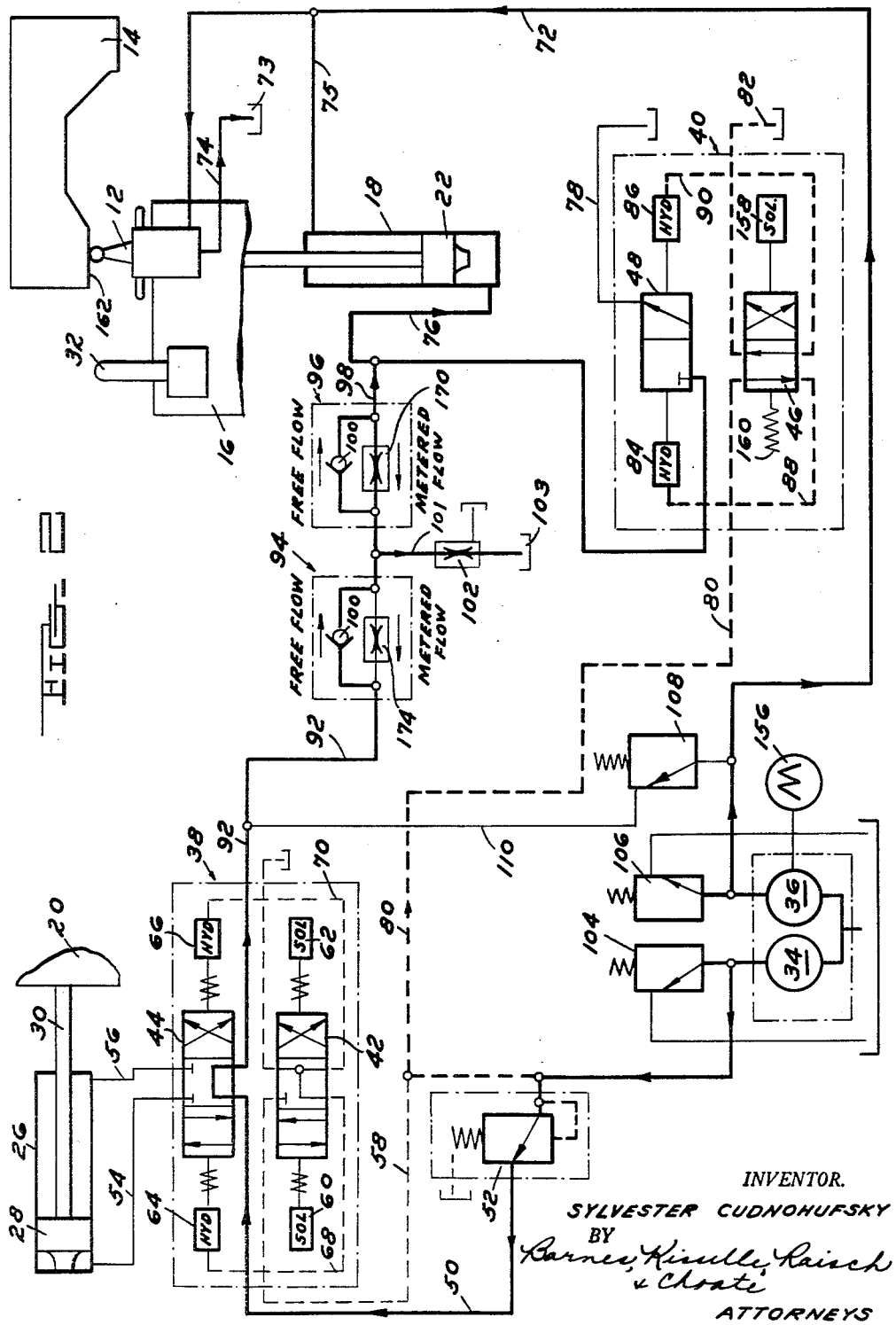

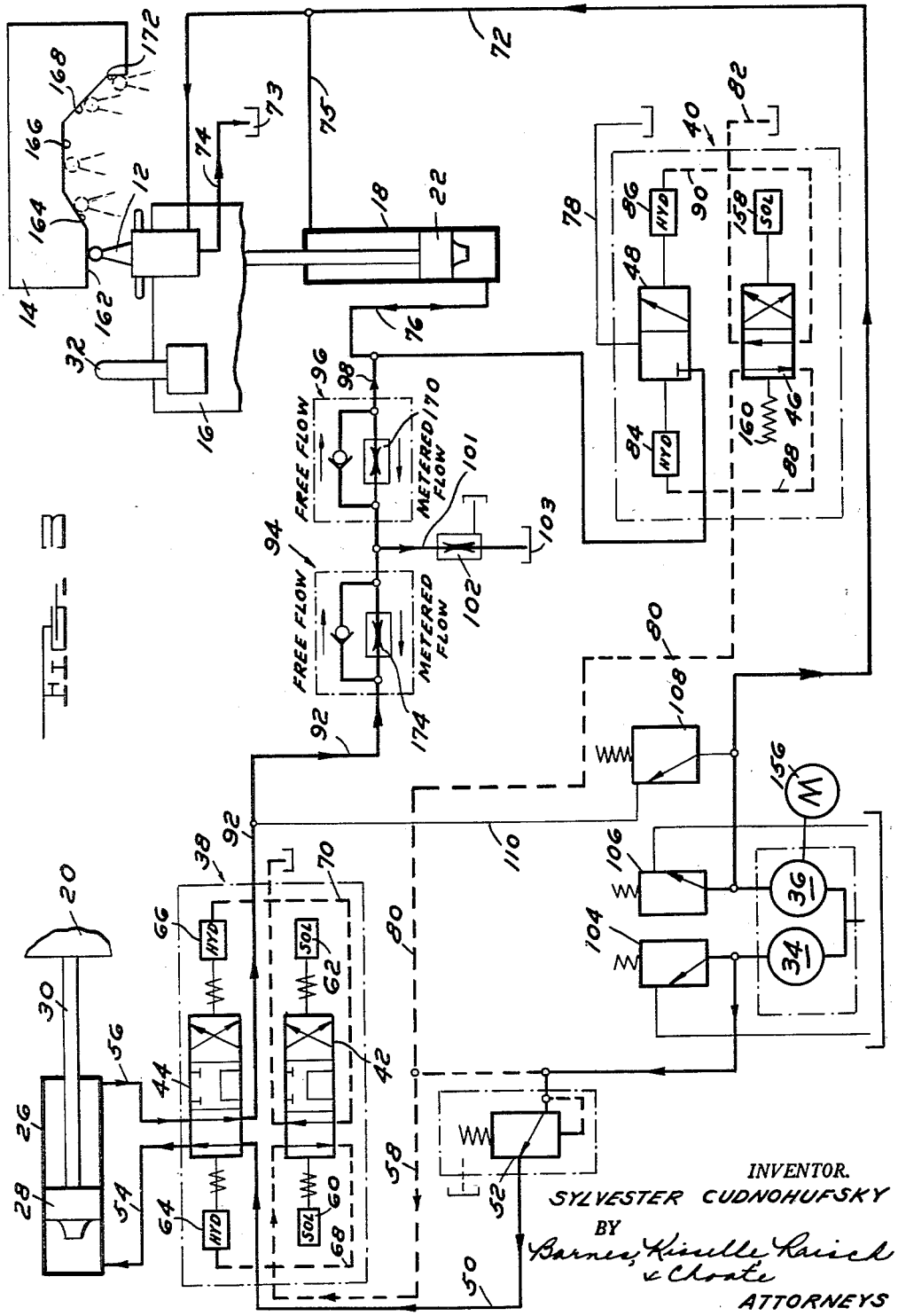

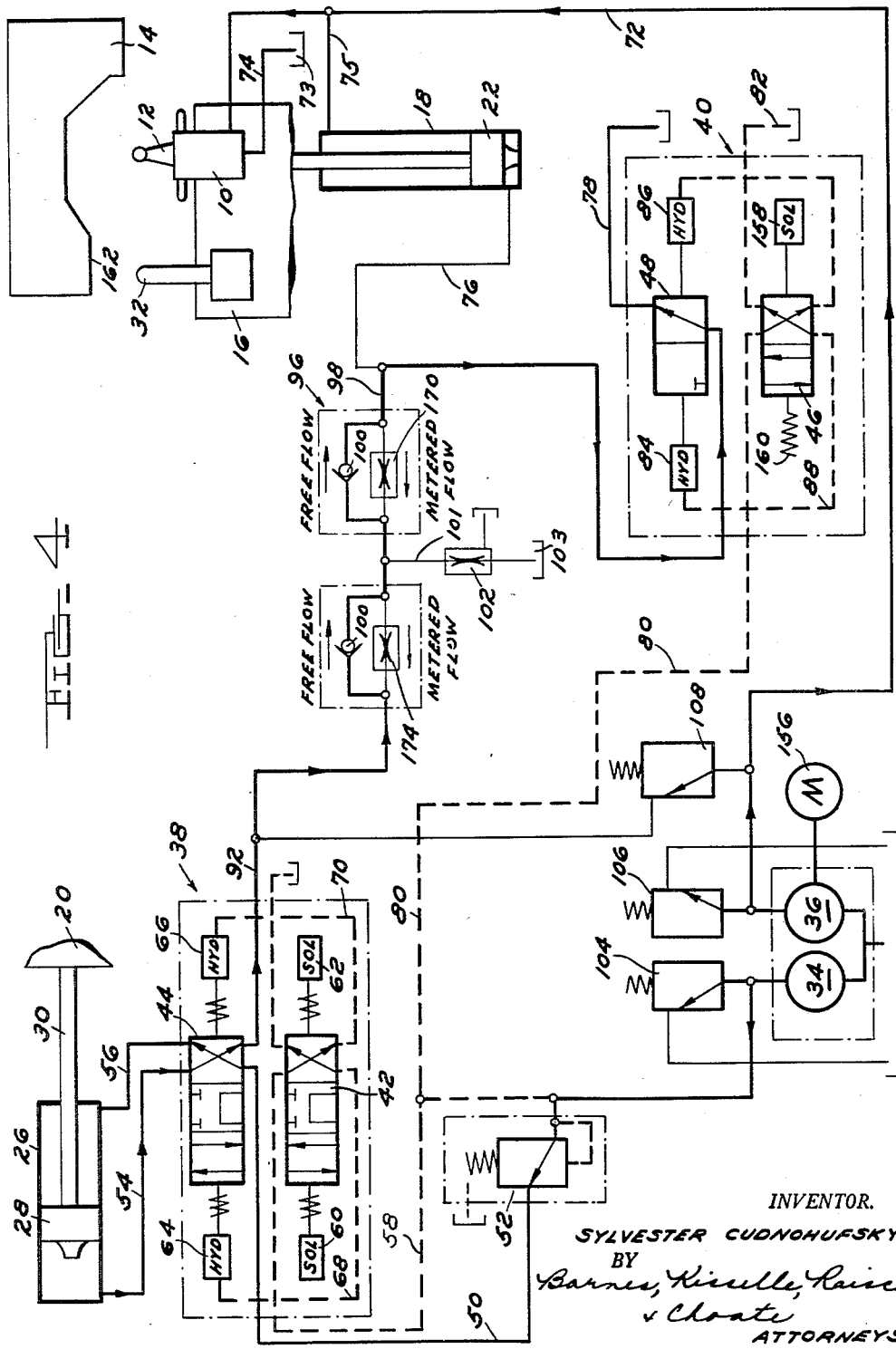

2,940,263

TRACER CONTROL CIRCUIT FOR MACHINE TOOLS

Sylvester Cudnohufsky, 3650 Lapeer Road, Pontiac, Mich.

Filed Aug. 29, 1958, Ser. No. 758,126

34 Claims. (Cl. 60—97)

This invention relates to improvements in tracer control circuits for governing the automatic operation of pattern-controlled machine tools.

Pattern-controlled machine tools are usually provided with means for moving the cutting tool in two perpendicularly related directions by means of a pair of hydraulically controlled piston-cylinder assemblies. The degree of relative actuation of the two piston-cylinder assemblies so as to produce movement of the cutting tool angularly is often determined by the movement of a single stylus or finger in following a template or pattern which in turn controls a tracer valve. The design of tracer control circuits capable of causing a stylus to accurately follow an irregular contour on a template or pattern has usually involved the use of a very complicated valve arrangement which includes numerous valves that have been considered necessary to insure an accurate tracing movement of the stylus relative to the template. Even with such complicated valve arrangements, difficulty is very often encountered where the angular change in direction on the pattern is relatively great.

Another problem that has presented itself in connection with tracer control circuits is the necessity to reduce the feed rate as the stylus undergoes a change in direction of movement to avoid cutting on the workpiece a transition line resulting from the momentary opening or closing of a valve in the control circuit.

It is an object of the present invention to provide a tracer control circuit for machine tools which is of relatively simple design and which, at the same time, is capable of producing an extremely accurate following of the pattern or template by the tracer stylus or finger.

A further object of the invention resides in the provision of a tracer control circuit involving a single tracer valve in combination with a minimum of other valves.

Another object of the invention resides in the provision of a tracer control circuit which includes a relatively simple valve arrangement that enables feeding of a cutting tool in either of two opposite directions in a pattern controlled manner.

A further object of the invention is to provide a tracer control circuit designed such as to eliminate the necessity for reducing the feed rate as the stylus undergoes a change in direction.

A still further object of the invention is to provide a tracer control circuit wherein the valves controlling the operation of the feed cylinders during the tracing cycle are in the nature of flow control valves as distinguished from directional valves so that feed cylinders are controlled by the rate of flow and not by the opening or closing of valves.

Other objects and advantages of the invention will become apparent from the accompanying description taken with the drawings, in which:

Fig. 1 is a diagrammatic view of a tracer control circuit embodying the present invention, the various valves being shown in the positions assumed when the circuit is energized and running idly.

Fig. 2 is a view similar to Fig. 1 showing the control circuit conditioned to cause the tracer finger to approach the template.

Fig. 3 is a view similar to Fig. 1 showing the control circuit conditioned for initiating the tracing cycle, that is, for causing the tracer finger to follow the pattern of the template.

Fig. 4 is a view similar to Fig. 1 showing the control circuit conditioned to retract the tracer finger to the starting position.

Fig. 5 is a semi-diagrammatic sectional view of the tracer valve.

In the drawings, the tracer valve is generally designated 10 and has a finger or stylus 12 mounted thereon for tracing the contour of a pattern or template 14. To illustrate the operation of the improved control circuit of this invention, it may be assumed that the tracer is used on a lathe. On such a machine tool, the template 14 could be fixedly mounted on the bed of the lathe and the tracer valve 10 could be mounted on the cross slide of the lathe which is generally designated 16. A cylinder 18 mounted on the carriage 20 of the lathe houses a piston 22 which is connected by a rod 24 with cross slide 16. A cylinder 26 encloses a piston 28 which is connnected by a rod 30 with carriage 20. Actuation of piston 28 causes the stylus 12 to be fed in a longitudinal direction while actuation of piston 22 produces movement of stylus 12 in a transverse or cross feed direction normal to the longitudinal feed. The cutting tool, generally designated 32, is shown mounted on the cross slide 16. The source of hydraulic fluid under pressure for operating the two cylinders comprises two pumps 34 and 36. Pump 34 may be referred to as the low pressure pump capable of developing a relatively low, substantially constant pressure, say 400 pounds per square inch. Pump 36, on the other hand, is referred to as the high pressure pump which is capable of instantaneously developing a relatively high pressure, for example, 1,000 pounds per square inch.

The means for controlling the directional flow of hydraulic fluid through the circuit comprise two pilot controlled valves 38 and 40. Valve 38 is a four-way solenoid controlled, pilot operated, valve of the spring-centered type. Valve 40 is a two-way valve of the solenoid controlled, pilot operated, spring-offset type. The pilot valve component of valve 38 is designated 42 while the main directional valve component of valve 38 is designated 44. Likewise, in the case of valve 40, the pilot component is designated 46 and the directional valve component is designated 48.

Low-pressure pump 34 connnects with the directional valve 44 by means of a line 50. Within this line, there is arranged a sequence valve 52 of the external drain type. The head end of cylinder 26 is connected with the directional valve 44 by a line 54 while the rod end of cylinder 26 is connnected with the directional valve 44 by a line 56. Pilot valve 42 is connected to pump 34 through a line 58. Pilot valve 42 is of the conventional type including two solenoids 60 and 62 for shifting the spool of the valve in opposite directions. The opposed operating cylinders 64 and 66 are connnected with the pilot valve 42 by means of lines 68 and 70, respectively.

For the purpose of simplification, in the drawings the pilot oil lines are shown as broken lines while the actual flow lines of the control circuit are shown in solid lines. Furthermore, the oil lines which are operative in the particular portions of the cycle illustrated in Figs. 1, 2, 3 and 4 are shown in heavy lines and the oil lines which may be considered as idle are shown in light lines.

The inlet port of tracer valve 10 is connected with the high-pressure pump 36 by means of a line 72 and the outlet of valve 10 drains to a sump 73 through a line 74. The rod end of cylinder 18 connects with feed line 72 by means of a branch line 75 and the head end of cylinder 18 is connected with the directional valve 48 through a line 76. Valve 48 also has a drain line 78. A branch conduit 80 connects the pilot valve 46 with the pilot feed line 58 for valve 42. The drain line for pilot valve 46 is indicated at 82. The opposed hydraulic cylinders 84 and 86 for shifting the spool of valve 48 in opposite directions are connected with the pilot valve 46 by means of lines 88 and 90, respectively. Directional valve 44 connects with line 76 through a conduit 92, a pair of unidirectional flow control valves 94 and 96 connected in series and a conduit 98. The flow control valves 94 and 96 are of the adjustable type which are not compensated for pressure. Check valves 100 in each of these flow controls permit free flow in the direction from longitudinal feed cylinder 26 to transverse or cross feed cylinder 18 as illustrated. A third flow control valve 102 of the adjustable type is located in the exhaust line 101 which is connected between the two flow control valves 94 and 96. Flow control 102 is of the pressure compensated type. Exhaust line 101 discharges into a sump 103.

A relief valve 104 is arranged in feed line 50 between pump 34 and sequence valve 52. Another relief valve 106 is arranged in feed line 72. Valve 104 is set to relieve the pressure in line 50 when it exceeds a predetermined value, for example, 400 pounds per square inch. Valve 106 is set to relieve the pressure in line 72 when it exceeds a much higher value, for example, 1,000 pounds per square inch. An additional relief valve 108 is connected into line 72. The outlet of relief valve 108 is connected into line 92 as by conduit 110. Valve 108 is set to relieve the pressure in line 72 at a value intermediate the settings of valves 104 and 106.

Referring now to Fig. 5, the tracer valve employed with this circuit is illustrated. This valve includes a valve body 112 that is provided with a bore 114. Within bore 114, there is arranged a piston 116, the lower end of which is reduced as at 118. The reduced end 118 of piston 116 is arranged to reciprocate in the smaller diameter bore portion 120 which communicates with the outlet port 122 of the valve. The inlet port 124 communicates with bore 114 on the underside of a shoulder 126 formed on piston 116. The portion of bore 114 extending circumferentially around shoulder 126 is enlarged as at 128 while the portion of piston 116 just above shoulder 126 is reduced in diameter as at 130. A series of radially extending passageways 132 establish communication between the enlarged bore portion 128 and the axially extending passageway 134 in piston 116, the lower end of which opens into the reduced bore 120.

In the upper end of valve body 112, there is arranged a plunger 136 which is guided for axial movement by a bearing 138. The lower end of plunger 136 abuts against the upper end of piston 116 through a bearing 140. The upper end of plunger 136 is V-shaped as at 142 for engagement in a V-shaped notch 144 in stylus 12. As illustrated, stylus 12 is generally of inverted T shape with the central leg provided with a rounded end 146 which is adapted to contact and trace along the patterned edge of template 14. Thumb screws 148 are mounted on the tracer valve on opposite sides of plunger 136. The thumb screws 148 are adjustable to vary the extent of pivoting movement of the stylus 12 in opposite directions about the fulcrum 142.

The operation of the tracer valve 10 itself can be briefly described as follows: When oil is admitted to the inlet 124 of the valve through line 72, the oil flows into chamber 150; and in view of the fact that the shoulder 126 on piston 116 cooperates with the shoulder 152 at the enlarged portion 128 of bore 114 to form an annular orifice 154 which is of relatively small size, the pressure of the oil is exerted against the underside of shoulder 126 to bias piston 116 upwardly and thereby urge the stylus 12 against the ends of the adjusting screws 148. The oil passing through orifice 154 flows upwardly into the enlarged bore portion 128 and then through the radial passageways 132 in piston 116 to the outlet port 122 and through the exhaust line 74 to sump 73. The back pressure produced by orifice 154 is exerted in the rod end of cylinder 18; and as long as the total force acting on the top side of piston 22 is greater than the total force acting on the bottom side of the piston, the piston will be biased downwardly or inwardly of cylinder 18 and the cross slide 16 will thus be retracted. When the total force acting on the bottom side of piston 22 is greater than the total force acting on the top side of this piston, the cross slide 16 will be fed inwardly towards the work. However, the construction of tracer valve 10 is such that an equilibrium condition is always maintained. If the end 146 of the stylus 12 tends to bear against the template 14 with excessive force, piston 116 will be shifted downwardly in the valve body 112, thus further restricting orifice 154 and increasing the back pressure in line 72. The force on the top side of piston 22 thus immediately rises to a value greater than the force on the bottom side of piston 22 and the tracer valve as a whole tends to move in a direction away from the template, thus decreasing the contact force between the stylus and the template. As the contact pressure between the stylus and the template decreases, orifice 154 becomes enlarged and the back pressure in line 72 diminishes so that an equilibrium condition is always maintained. This particular design of tracer valve renders the valve so sensitive that the response to the changes in pressure is instantaneous; and consequently, there is no hunting. Stated differently, as soon as the stylus tends to bear against the template with a force other than which the tracer valve is designed, the size of orifice 154 immediately varies to an extent that the forces on the opposite sides of piston 22 immediately tend to balance one another. The force with which the stylus 12 normally bears against the template is determined by the relative diameters of bore portions 120 and 114 in valve body 112. Experience has shown that a force of about 8 pounds is satisfactory.

The operation of the tracer as controlled by the circuit disclosed herein will now be described. Referring first to Fig. 1, the circuit is there illustrated in the energized idling condition. The circuit is set in this condition by closing a main switch, not illustrated, which energizes the electric motor 156 that drives pumps 34 and 36 and also energizes solenoid 158 of pilot valve 46. At this time, solenoids 60 and 62 of pilot valve 42 are deenergized. Thus, the oil merely circulates through the system at substantially no pressure since the stylus 12 is out of contact with the template and the orifice 154 is wide open. The back pressure produced in line 72 under this condition is only sufficient to overcome the inertia of and retract the cross slide 16. The sequence valve 52, which, in effect, serves as a relief valve, produces sufficient back pressure in line 80 to actuate cylinder 86 of directional valve 48 so that the line 76 from the head end of cylinder 18 will be connected to the sump through valve 48 and line 78. Thus, the oil from pump 36 merely circulates through the tracer valve and back to sump 73 through exhaust 74. The oil from pump 34 flows freely through line 50, through the shunted center of directional valve 44 and then through line 92, flow control valves 94, 96 (through the free-flow shunts of these valves), through the conduit 98 and to the sump through line 76, valve 48 and line 78.

To initiate the tracing cycle, the stylus 12 of the tracer valve is caused to approach the template in the manner illustrated in Fig. 2. This is accomplished by actuating an approach switch, not illustrated, which deenergizes solenoid 158. When solenoid 158 is deenergized, the spool of valve 46 is shifted to the right under the influence of spring 160 and, as illustrated, the pilot line 80 is thus connected to actuate cylinder 84 and thus shift the spool of directional valve 48 to the right and thereby stop the flow of oil to the sump through line 78. Upon the closing of directional valve 48, the pressure of the oil flowing from pump 34 through line 50 builds up to a value such that the force on the underside of piston 22 exceeds the force on the upper side of piston 22 (orifice 154 in the tracer valve is wide open) and the cross slide 16 is fed inwardly toward the work until the stylus 12 contacts the flat surface portion 162 at one end of template 14. When the stylus 12 contacts the surface 162, orifice 154 in the tracer valve is immediately restricted and the pressure of the oil in lines 72 and 75 immediately builds up to a value wherein the forces acting upon the opposite sides of piston 22 balance one another and the cross slide 16 thus remains stationary with the stylus 12 contacting the surface 162 of template 14 with the predetermined force for which the tracer valve is designed, as described previously.

With the stylus 12 thus properly advanced into contact with one end of the contoured surface of the template 14, the feed portion of the tracing cycle may be initiated by energizing either of solenoids 60 or 62 of pilot valve 42 (Fig. 3). In the arrangement illustrated, the tool is being shown fed from left to right; and thus, in Fig. 3, the solenoid 60 is shown energized. When solenoid 60 is energized, the oil in the branch pilot line 58 is conducted through pilot valve 42 to the cylinder 64 of directional valve 44. Thus, the oil in line 50 from the low-pressure pump 34 is directed through the directional valve 44 and through the line 54 to the head end of cylinder 26. The carriage 20 is thus fed in a direction to the right and the rate of feed is controlled by the rate at which the oil is displaced from the rod end of cylinder 26.

As piston 28 in cylinder 26 moves to the right, oil is discharged from the rod end of the cylinder through line 56 and through the directional valve 44 to the line 92. The pressure of the oil in line 92 balances the pressure of the oil in the head end of cylinder 18 so that piston 22 remains stationary in cylinder 18 and all the oil displaced from the rod end of cylinder 26 is discharged from the system through the flow control valve 102. As mentioned previously, valve 102 is of the pressure compensated type so that regardless of the pressure in the lines, the flow through valve 102 never exceeds the maximum value for which it is set and the maximum rate of longitudinal feed of the carriage is thus controlled.

When the stylus 12 moves on to the forwardly inclined surface 164 on the template, the contact pressure of the stylus against the template is momentarily relieved. The stylus tends to pivot clockwise about the adjusting screw 148 at the left, thus instantaneously reducing the restriction at orifice 154 in the tracer valve and causing the back pressure in line 72 and in the rod end of cylinder 18 to drop slightly. In response to the drop in pressure in the rod end of cylinder 18, the cross slide 16 feeds inwardly while the carriage 20 is moving to the right and the stylus is thus caused to follow the forwardly inclined surface 164 on the template.

It will be appreciated, of course, that if the inclination of the forward incline shown at 164 on the template is too steep, then the maximum opening of orifice 154 as determined by adjusting screws 148 will be incapable of bypassing oil at a sufficiently rapid rate from the rod end of cylinder 18 to maintain the stylus in contact with the template at the longitudinal feed rate for which the tracer is set. However, experience has shown that with the tracer control circuit described herein, a forward incline as great as 30° to the longitudinal can be traced without any difficulty at all. Forwardly inclined shoulders of even greater than 30° have been successfully traced with this control circuit. The setting of screws 148 determines the rate of transverse feed inwardly. However if screws 148 are backed off too far, then the stylus 12 has a tendency to pivot about the screw 148 at the left too freely when the stylus encounters a forward incline and the cutting tool will have a tendency to plunge into the work.

As the stylus follows the forwardly inclined surface 164 on the template and encounters the straight longitudinally extending surface 166, there is a momentary and instantaneous greater restriction at the orifice 154 in the tracer valve; and there is a corresponding instantaneous and momentary increase in back pressure in lines 72 and 75 and the rod end of cylinder 18. The forward feed of the cross slide 16 is thus arrested, since, as previously described, the pressure of the oil in the rod end of cylinder 18 automatically and instantaneously establishes itself at a value producing an equilibrium condition of the piston 22 in cylinder 18.

Eventually, the stylus 12 encounters the reversely inclined surface 168 on the template. When this occurs, the stylus tends to pivot counterclockwise about the adjusting screw 148 at the right, thus effecting an instantaneous and momentary greater restriction of the orifice 154 in the tracer valve to an extent such that the back pressure in lines 72, 75 and the rod end of cylinder 18 increases to a value where the force acting on the top side of piston 22 exceeds the force of the oil acting on the bottom side of piston 22 and the cross slide is progressively retracted as the carriage continues to move in the direction toward the right. When this occurs, it will be appreciated that oil is discharged from the head end of cylinder 18. Since oil flows through the line 76 and since the directional valve 48 is closed to the sump, the oil discharged from the head end of cylinder 18 is caused to flow through the flow control valve 96. The check valve 100 in flow control valve 96 restricts the flow of oil through the valve to the metering orifice 170.

In this connection, I have discovered that the arrangement of flow control valve 96 as shown is necessary to prevent a surge of oil in the head end of cylinder 18 and the consequent "lopping" or chattering of the stylus as it travels along the reverse incline 168. Without the provision of a flow control valve such as illustrated at 96, I have determined that the provision of the flow control valve 102 alone for controlling the rate of discharge of oil from the head end of cylinder 18 is incapable of preventing the stylus from surging back as it travels along the inclined surface 168 of the template. Flow control valve 96 serves as a dampener between the head end of cylinder 18 and the flow control valve 102. In practice, flow control valve 102 is set to produce the desired rate of feed of the carriage. Under normal flow conditions, the setting of valve 96 is such as to restrict the flow to a greater extent than the flow is restricted through valve 102. The proper setting of valve 96 is, however, very easily obtained. When the stylus 12 encounters a reversely inclined surface such as illustrated at 168, the orifice of valve 96 is simply progressively closed until a point is reached where the stylus no longer surges back from the inclined surface. Since valve 96 is not of the pressure compensated type, the volume of flow through the valve is responsive to the pressure of the oil in the head end of cylinder 18. However, the rate of discharge of oil from the system, and therefore, the rate of feed of the stylus, is at all events controlled by the valve 102 and thus maintained at a uniformly constant value.

Thus when the stylus encounters a reversely inclined surface such as illustrated at 168, a portion of the oil flowing to sump 103 through flow control valve 102 is that which is displaced from the rod end of cylinder 26 and another portion is that which is displaced from the head end of cylinder 18. The maximum flow, which determines the feed rate, is at all events controlled by the setting of valve 102.

When the stylus 12 encounters the straight shoulder 172 on the template, there is again an immediate and momentary increase in the restriction at orifice 154 in the tracer valve. Consequently, the back pressure in lines 72, 75 and the rod end of cylinder 18 immediately builds up to a value wherein the total force on the top side of piston 22 in cylinder 18 is greater than the force on the bottom side of the piston and the cross slide 16 is retracted. The pressure of the oil in lines 76 and 98 immediately builds up to a value greater than the maximum pressure that is capable of being developed in line 92 by pump 34. Thus, the longitudinal feed of the carriage 20 is instantaneously arrested; and the oil discharged from the system through the flow control valve 102 is that oil which is being displaced by the inward or downward movement of piston 22 in cylinder 18. In this connection, it will be observed that the rate at which the carriage retracts is also governed by the setting of valve 102. Thus, the single valve 102 controls the maximum rate of both longitudinal and transverse feeding.

Flow control valve 94 is in the nature of a safety valve. If the template 14 should become cocked on the bed of the machine so that the shoulder 172 inclines in a direction reversely to the longitudinal feed, then it is clear that the carriage 20 must be capable of being retracted by the piston 28 in cylinder 26. Valve 94 is set such that its orifice 174 is only slightly open. Thus, if template 14 should become cocked as described, the back pressure in line 72 and in the rod end of cylinder 18 will immediately rise to a sufficiently high value to cause a portion of the oil discharged from the head end of cylinder 18 to feed back through valve 94 and into the rod end of cylinder 26 to retract the piston 28 therein.

Relief valve 106 is always set to relieve pressure at a higher value than the setting of relief valve 104 so that the pressure in the rod end of cylinder 18 can at all times exceed the pressure in the head end of this cylinder. It is this relative setting of relief valves 104 and 106 that enables the longitudinal feed to be arrested whenever necessary.

Relief valve 108 also serves as a safety valve in the circuit. If the oil lines between the head end of cylinder 18 and flow control valve 102 should become clogged for any reason and the stylus 12 should encounter a shoulder that requires retraction of the cross slide, then the excessive back pressure that would be built up in line 72 would be bled back into the rod end of cylinder 26 through relief valve 108 and line 92. For this reason, valve 108 is set to relieve the pressure in line 72 at a value intermediate the settings of valves 104 and 106. When the pressure in line 72 tends to exceed the setting of valve 108, valve 108 simply opens and the longitudinal feed of the stylus is immediately arrested.

After the stylus has completed its travel along the contoured surface of the template and it is desired to return the stylus to the starting position illustrated in Fig. 1, a switch, not illustrated, is actuated to energize solenoid 158 of the pilot valve 46 and solenoid 62 of pilot valve 42. Simultaneously therewith, solenoid 60 of pilot valve 42 is deenergized. Fig. 4 shows the valves in the position assumed for retraction of the stylus. With the valves in the positions illustrated, the head end of cylinder 26 and the head end of cylinder 18 are both connected to the sump through the directional valve 48 and the line 78. The unrestricted flow of oil from the head ends of both cylinders causes both pistons to retract freely in their respective cylinders and the stylus is returned to the starting position.

It will be appreciated that the particular arrangement of cylinders illustrated is optional and not by way of limitation. For example, if desired, the piston rod 24 could be anchored on the carriage and the cylinder 18 connected to the cross slide. Likewise, the piston rod 30 could be fixed at one end on the bed of the machine and the cylinder 26 connected to the carriage. It will also be appreciated that the specific pressures heretofore recited have been stated merely for the purpose of illustration and not by way of limitation. It is the relative pressures capable of being developed in the lines 50 and 72 that are important. It is essential that the pump 36 be capable of generating a substantially higher pressure than pump 34 so that at all events, the force acting on the top side of piston 22 is capable of exceeding the force developed on the bottom side of the piston 22 so that the carriage can be retracted.

Thus it will be seen that the tracer control circuit of this invention utilizes a single tracer valve for controlling the operation of both feed cylinders and a minimum of other valves. The valves operative during the tracing cycle are all in the nature of flow rate controlling valves. The oil flow through the circuit never stops in order to effect a change in speed or direction. Thus the operation is smooth and continuous at all times. This in turn enables the utilization of a high rate of feed without a tendency for the cutting tool to leave a transition line on the workpiece when the stylus encounters a different incline from that on which it has been tracing. This is extremely important in machining work pieces that require a high degree of accuracy. With the tracer control circuit of this invention, the rate of feed is not determined by any limitations inherent in the operation of the circuit but rather by the particular machining operation being performed.

This application is a continuation-in-part of my copending application Serial No. 476,426, filed December 20, 1954, now abandoned.

I claim:

1. In a tracer control circuit for governing the operation of a pair of feed cylinders arranged to feed a cutting tool in angularly related directions, the combination of two sources of hydraulic pressure, one being capable of developing a higher pressure than the other, a tracer valve, a feed line connecting the tracer valve with the source of higher pressure, pattern controlled actuating means for controlling the tracer valve to variably restrict the flow therethrough and thereby vary the pressure in said feed line, means connecting the feed line with one end of one of said cylinders, a feed line extending from said source of lower pressure to one end of the other cylinder, a common discharge line connecting the other ends of said cylinders to exhaust, means in said discharge line for permitting free flow therein in a direction from the second cylinder to the first and for preventing free flow in the opposite direction and means in said discharge line for restricting the rate of flow from said line to exhaust to a predetermined maximum value.

2. The combination set forth in claim 1 wherein said last mentioned means comprises a pressure compensated flow control valve.

3. The combination set forth in claim 1 including means in said discharge line located between said last mentioned means and said first cylinder for limiting the rate of flow from the first cylinder to said last mentioned means to a value normally less than the maximum rate of flow permitted by said last mentioned means to exhaust.

4. In a tracer control circuit for governing the operation of a pair of hydraulic feeding devices of a pattern-controlled machine, the combination of a source of relatively high pressure, means connecting one of said feeding devices with said source of high pressure, a tracer valve for controlling the pressure of the fluid supplied by said source to said one feeding device, a source of lower pressure, means connecting the source of lower pressure to the other feeding device, a return line extending between said feeding devices, means in said return line permitting free flow therethrough in the direction from said other feeding device to said one feeding device and preventing free flow therethrough in the opposite direction and means restricting flow from said return line to exhaust at a predetermined maximum rate.

5. The combination set forth in claim 4 including means for optionally connecting said return line for free flow to exhaust.

6. The combination set forth in claim 4 wherein said last mentioned means comprises a flow control valve arranged to limit the flow to exhaust to a maximum rate independently of the pressure in said return line.

7. The combination set forth in claim 6 including a second flow control valve in said return line between said first mentioned flow control valve and said one feeding device, said second flow control valve being arranged to limit the maximum flow from said one feeding device towards said first valve at a maximum rate which varies with the pressure.

8. The combination set forth in claim 7 wherein said second flow control valve normally restricts the flow to a rate less than the maximum rate permitted by the first flow control valve.

9. In a tracer control circuit for governing the operation of longitudinal and transverse feed cylinders of a pattern-controlled machine tool, the combination of a source of pressure, a second source of pressure capable of delivering a pressure higher than said first source, a feed line extending from said source of higher pressure to one end of said transverse feed cylinder, a tracer valve for regulating the pressure in said feed line, a feed line connecting the source of lower pressure with one end of said longitudinal feed cylinder, a return line extending between the other ends of the two cylinders, means in said return line permitting substantially free flow in the direction from the longitudinal feed cylinder to the transverse feed cylinder and preventing free flow in the opposite direction and means for permitting flow from said return line to exhaust at a restricted rate.

10. The combination set forth in claim 9 wherein said source of higher pressure is connected with said transverse feed cylinder such that an increase in pressure in said first mentioned feed line tends to produce retraction in said transverse feed cylinder.

11. The combination set forth in claim 9 including means for optionally connecting said second feed line to either end of said longitudinal feed cylinder.

12. The combination set forth in claim 9 including means for optionally connecting said second feed line directly with said return line and said return line directly with exhaust.

13. The combination set forth in claim 9 including means responsive to an increase in pressure in said first mentioned feed line above a predetermined value for connecting said first mentioned feed line with said return line at a point upstream from said means for preventing free flow in said return line.

14. In a tracer control circuit for governing the operation of longitudinal and transverse feed cylinders of a pattern-controlled machine tool, the combination of a source of pressure, a second source of pressure capable of delivering a pressure higher than said first source, a feed line extending from said source of higher pressure to one end of said transverse feed cylinder, a tracer valve for regulating the pressure in said feed line, a feed line connecting the source of lower pressure with one end of said longitudinal feed cylinder, a return line extending between the other ends of the two cylinders, spaced apart first and second means in said return line for permitting substantially free flow therein in the direction from the longitudinal feed cylinder to the transverse feed cylinder and preventing free flow in the opposite direction, a discharge line to exhaust connected to said return line intermediate said last two mentioned means and a flow control valve in said discharge line for restricting the rate of flow to exhaust to a predetermined maximum value independently of the pressure in said return line.

15. In a tracer control circuit for governing the operation of longitudinal and transverse feed cylinders of a pattern-controlled machine tool, the combination of a source of pressure, a second source of pressure capable of delivering a pressure higher than said first source, a feed line extending from said source of higher pressure to one end of said transverse feed cylinder, a tracer valve for regulating the pressure in said feed line, a feed line connecting the source of lower pressure with one end of said longitudinal feed cylinder, a return line extending between the other ends of the two cylinders, means in said return line permitting unidirectional free flow therein from said longitudinal feed cylinder to said transverse feed cylinder, a discharge line connected with said return line and having means therein for restricting the maximum rate of flow from said return line to exhaust to a predetermined amount, said discharge line being connected with said return line on the upstream side of said unidirectional flow control means.

16. The combination set forth in claim 15 including means in shunt relation with said unidirectional flow control means for restricting the rate of flow from said transverse feed cylinder towards said discharge line in response to the pressure in said return line between said transverse feed cylinder and said unidirectional flow control means.

17. The combination set forth in claim 16 wherein said second mentioned flow control means normally restrict the flow to an extent greater than said first mentioned flow control means.

18. In a tracer control circuit for governing the operation of longitudinal and transverse feed cylinders of a pattern-controlled machine tool, the combination of a source of pressure, a second source of pressure capable of delivering a pressure higher than said first source, a feed line extending from said source of higher pressure to one end of said transverse feed cylinder, a tracer valve for regulating the pressure in said feed line, a feed line connecting the source of lower pressure with one end of said longitudinal feed cylinder, a return line extending between the other ends of the two cylinders, means in said return line permitting free flow therein in the direction from the longitudinal feed cylinder to the transverse feed cylinder and permitting metered flow therein in the opposite direction, an exhaust line connected with said return line between said last mentioned means and said longitudinal feed cylinder, and means in said exhaust line for controlling the maximum rate of flow therethrough to an amount normally less than the rate of flow permitted by said flow metering means in said return line.

19. The combination set forth in claim 18 wherein said flow metering means controls the flow in said return line in response to the pressure therein and wherein the flow control means in said exhaust line restrict the flow therein to a maximum rate independently of the pressure in said exhaust line.

20. The combination set forth in claim 19 including a second means in said return line located between said longitudinal feed cylinder and said exhaust line for permitting free flow in said return line from said longitudinal feed cylinder towards said transverse feed cylinder and for permitting metered flow in the opposite direction.

21. The combination set forth in claim 20 wherein said last mentioned flow metering means are arranged to restrict the flow in said return line to said longitudinal feed cylinder to a maximum rate substantially less than said first mentioned flow metering means.

22. In a tracer control circuit for governing the operation of a feed cylinder of a pattern-controlled machine tool, the combination of a source of relatively high pressure connected to one end of the feed cylinder, a source of relatively low, substantially constant pressure connected to the opposite end of the feed cylinder, a tracer valve connected with said source of relatively high pressure for controlling the pressure in said cylinder at said one end thereof, means permitting unidirectional free flow from said source of low pressure to said opposite end of said cylinder, and means for discharging oil from said opposite end of said cylinder to exhaust at a controlled rate.

23. In a tracer control circuit for governing the operation of a feed cylinder of a pattern-controlled machine tool, the combination of a source of relatively high pressure, a feed line connecting said source of relatively high pressure with one end of said feed cylinder, a tracer valve connected with said feed line for controlling the pressure in said one end of said cylinder, a source of relatively low, substantially constant pressure, a feed line connecting said source of substantially constant pressure with the other end of said cylinder, means in said last mentioned feed line limiting the free flow therein to a direction from said low pressure source of pressure to said feed cylinder, an exhaust line connected with said other end of said cylinder on the downstream side of said last mentioned means and means in said exhaust line for restricting the rate of exhaust flow therethrough to a predetermined maximum value.

24. The combination set forth in claim 23 including pattern controlled means for actuating said tracer valve, said tracer valve having an adjustable orifice therein communicating with said first mentioned feed line, said pattern controlled actuating means being responsive to vary the size of said orifice to control the pressure in said feed line and thereby control the direction and rate of operation of said feed cylinder.

25. The combination set forth in claim 4 including pattern controlled actuating means for said tracer valve, said tracer valve having an adjustable orifice therein communicating with said means connecting one of said feeding devices with said source of high pressure, said actuating means being adapted to vary the size of said orifice to control the pressure in said last mentioned connecting means and thereby control the rate and direction of relative movement of said two feeding devices.

26. In a tracer control circuit for governing the operation of a feed cylinder of a pattern controlled machine tool, the combination of a source of relatively low, substantially constant pressure, a feed line connecting said low pressure source with one end of said feed cylinder, a source of relatively high pressure, a feed line connecting said high pressure source with the opposite end of said feed cylinder, a tracer control valve having an inlet port communicating with said last mentioned feed line, said tracer valve also having an outlet port and a restrictable orifice between said inlet and outlet ports, means connecting said outlet port with exhaust, pattern controlled actuating means for controlling the degree of restriction of said orifice, said orifice when fully open being adapted to accommodate the fluid flow from said high pressure source without appreciably increasing the pressure thereof, whereby under said conditions, the feed cylinder is actuated in one direction under the bias of said relatively low, generally constant pressure, and when said pattern controlled actuating means produces restriction at said orifice, the back pressure in said high pressure feed line opposes the relatively low, substantially constant pressure at said one end of the feed cylinder to control the rate and direction of operation of said feed cylinder.

27. In a tracer control circuit for governing the operation of a feed cylinder of a pattern controlled machine tool, the combination of a source of relatively low, substantially constant pressure, a feed line connecting said low pressure source with one end of the feed cylinder, a source of relatively high pressure, a feed line connecting said high pressure source with the other end of the feed cylinder, a tracer valve having an inlet port and an outlet port, a passageway in said valve connecting said inlet and outlet ports, a restrictable orifice in said passageway, said inlet port communicating with said relatively high pressure source, said outlet port being connected to exhaust and pattern controlled actuating means for said tracer valve, said pattern controlled actuating means being adapted to vary the restriction of said orifice, said orifice when fully open being capable of accommodating the flow from said relatively high pressure source without appreciably increasing the pressure thereof whereby under said condition, the feed cylinder is actuated in one direction under the bias of said generally constant low pressure, and when said pattern controlled actuating means produces restriction at said orifice, the back pressure thereby produced at said other end of the feed cylinder opposes the low pressure at said one end of the feed cylinder to control the rate and direction of operation of said feed cylinder.

28. The combination set forth in claim 27 including means connecting the first mentioned end of said feed cylinder with exhaust and valve means for limiting the rate of exhaust from said first mentioned end of said feed cylinder.

29. In a tracer control circuit for governing the operation of a pattern controlled machine tool, the combination of a feed cylinder, a piston in said feed cylinder dividing the cylinder into two chambers, a source of relatively low, substantially constant pressure, a feed line connecting said low pressure source with the chamber on one side of the piston, a source of relatively high pressure, a feed line connecting said high pressure source with the chamber on the opposite side of the piston, a tracer valve having an inlet and an outlet, a passageway connecting said inlet and said outlet and having a restrictable orifice therein, said inlet communicating with said source of relatively high pressure and said outlet communicating with exhaust, pattern controlled actuating means for varying the degree of restriction of said orifice, said orifice when fully open being capable of accommodating the fluid flow from said source of relatively high pressure without appreciably increasing the pressure thereof, whereby under said condition, the piston will move in one direction under the bias of said generally constant pressure and when said actuating means produces restriction at said orifice, the back pressure resulting therefrom is effective in the chamber at said other side of the piston to oppose the generally constant pressure in the chamber on the first mentioned side of the piston whereby the piston moves relative to the cylinder in a direction and at a rate responsive to the degree of restriction at said orifice produced by said pattern controlled actuating means.

30. The combination set forth in claim 29, including means for limiting the rate of exhaust from the chamber connected with said source of relatively low constant pressure.

31. In a tracer valve for a pattern controlled machine tool, the combination of a valve body having a bore therein, said bore having at least two axially spaced portions of different diameters, a spool within said bore having a first portion slidably engaging within the smaller diameter portion of the bore and a second larger diameter portion cooperating with the larger bore portion to form an orifice, the size of which varies progressively in accordance with the axial movement of the spool in the bore, an inlet on said body communicating with the larger bore portion on the side of the orifice adjacent the smaller diameter portion of the spool, an exhaust port communicating with the larger bore portion on the other side of the orifice, whereby when pressure fluid is admitted to said valve through said inlet port, the spool is biased axially in a direction tending to increase the size of said orifice and a stylus movably mounted on said valve body and operably connected with said spool.

32. In a tracer valve for a pattern controlled machine tool, the combination of a valve body having a bore therein, said bore having at least two axially spaced portions of different diameters, a spool in said bore forming two pistons of differential area, the smaller piston slidably engaged within the smaller bore portion, the larger piston providing a shoulder cooperating with a portion of the larger diameter bore portion to form an orifice in said bore, the size of which varies progressively with the axial movement of the spool, an inlet port on the body communicating with the larger bore portion on the side of the orifice adjacent the smaller piston, an exhaust passageway in said valve communicating with the portion of the bore on the opposite side of the orifice, whereby when pressure fluid is admitted to said valve through said inlet port, the spool is biased axially in a direction tending to increase the size of said orifice and a stylus movably mounted on said valve body and operably connected with said spool.

33. A tracer valve as set forth in claim 32 wherein said stylus is mounted on the valve body for pivotal movement and including an axially shiftable member interconnecting said spool and stylus.

34. In a tracer valve for a pattern controlled machine tool, the combination of a valve body having a bore therein, said bore having at least three axially spaced portions of progressively increasing diameters, an axially movable spool in said bore, said spool having one portion slidably engaging the smallest bore portion, said spool having a second portion of larger diameter than the first portion and cooperating with a shoulder between the intermediate and largest diameter bore portions to form an orifice, the size of which varies in accordance with the axial movement of the spool in the bore, an inlet port in said valve body communicating with the bore portion of intermediate diameter, an exhaust port in said valve body communicating with the bore portion of largest diameter and a stylus movably mounted on said body and operably connected with said spool.

References Cited in the file of this patent

UNITED STATES PATENTS

| | | |
|---|---|---|
| 2,706,892 | Fritschi et al. | Apr. 26, 1955 |
| 2,841,356 | Glaser | July 1, 1958 |